(12) United States Patent
Skog

(10) Patent No.: US 10,602,560 B2
(45) Date of Patent: Mar. 24, 2020

(54) FIRST NETWORK NODE AND METHODS THEREIN, FOR DETERMINING WHETHER A SECOND MULTI PATH TRANSMISSION CONTROL PROTOCOL CONNECTION IS TO BE INITIATED

(71) Applicant: TELEFONAKTIEBOLAGET LM ERICSSON (PUBL), Stockholm (SE)

(72) Inventor: Robert Skog, Hässelby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/739,270

(22) PCT Filed: Jun. 26, 2015

(86) PCT No.: PCT/SE2015/050747
§ 371 (c)(1),
(2) Date: Dec. 22, 2017

(87) PCT Pub. No.: WO2016/099371
PCT Pub. Date: Jun. 23, 2016

(65) Prior Publication Data
US 2018/0184474 A1    Jun. 28, 2018

(51) Int. Cl.
*H04W 76/15* (2018.01)
*H04L 29/08* (2006.01)
(Continued)

(52) U.S. Cl.
CPC ............ *H04W 76/15* (2018.02); *H04L 67/14* (2013.01); *H04W 72/04* (2013.01); *H04W 76/30* (2018.02); *H04W 80/06* (2013.01)

(58) Field of Classification Search
CPC combination set(s) only.
See application file for complete search history.

(56) References Cited

U.S. PATENT DOCUMENTS

| | | | |
|---|---|---|---|
| 8,953,584 B1* | 2/2015 | Wang | H04L 45/44 370/235 |
| 10,075,987 B2* | 9/2018 | Teyeb | H04L 69/14 |

(Continued)

FOREIGN PATENT DOCUMENTS

| | | |
|---|---|---|
| EP | 2 538 637 A2 | 12/2012 |
| EP | 2 854 357 A1 | 4/2015 |

OTHER PUBLICATIONS

International Search Report and Written Opinion issued in Application No. PCT/SE2015/050747 dated Apr. 29, 2016, 10 pages.

(Continued)

*Primary Examiner* — Hicham B Foud
(74) *Attorney, Agent, or Firm* — Rothwell, Figg, Ernst & Manbeck, P.C.

(57) ABSTRACT

Method performed by a first network node (611) for determining whether a second Multi Path Transmission Control Protocol, MPTCP, connection (622) between the first network node (611) and a second network node (612) is to be initiated. The second MPTCP connection is part of a connection path (640) between a first device (631) and a second device (632). The second MPTCP connection (622) is in accordance with a second communication technology. The first network node (611) and the second network node (612) have an ongoing first MPTCP connection (621) in accordance with a first communication technology. The first network node (611) determines (701) an amount of resources associated with a usage of the first MPTCP connection (621). The first network node (611) determines (702) whether the second MPTCP connection (622) is to be initiated, based on whether the determined amount of resources meets a first criterion.

20 Claims, 12 Drawing Sheets

(51) Int. Cl.
*H04W 76/30* (2018.01)
*H04W 72/04* (2009.01)
*H04W 80/06* (2009.01)

(56) References Cited

U.S. PATENT DOCUMENTS

| | | | | |
|---|---|---|---|---|
| 10,143,001 B2* | 11/2018 | Schliwa-Bertling | .... | H04L 69/14 |
| 2008/0080412 A1* | 4/2008 | Cole | ........................ | H04L 45/00 |
| | | | | 370/328 |
| 2008/0080457 A1* | 4/2008 | Cole | .................. | H04L 12/5692 |
| | | | | 370/342 |
| 2012/0144062 A1* | 6/2012 | Livet | ........................ | H04L 45/24 |
| | | | | 709/239 |
| 2012/0188949 A1 | 7/2012 | Salkintzis et al. | | |
| 2013/0003595 A1* | 1/2013 | Soomro | ................ | H04W 48/18 |
| | | | | 370/252 |
| 2014/0362765 A1 | 12/2014 | Biswas et al. | | |
| 2015/0103663 A1* | 4/2015 | Amini | ............... | H04W 28/0215 |
| | | | | 370/235 |
| 2015/0237525 A1* | 8/2015 | Mildh | .................... | H04L 47/15 |
| | | | | 370/230.1 |
| 2015/0281367 A1* | 10/2015 | Nygren | ................ | H04L 47/193 |
| | | | | 709/228 |
| 2015/0312383 A1* | 10/2015 | Roeland | .................. | H04L 69/18 |
| | | | | 370/331 |
| 2015/0350337 A1* | 12/2015 | Biswas | ................ | H04L 67/142 |
| | | | | 709/228 |
| 2016/0183129 A1* | 6/2016 | Liu | ........................ | H04W 76/15 |
| | | | | 370/331 |
| 2016/0218960 A1* | 7/2016 | Sundarababu | .......... | H04L 45/08 |
| 2016/0227471 A1* | 8/2016 | De Foy | ................. | H04W 48/18 |
| 2016/0261722 A1* | 9/2016 | Paasch | .................. | H04L 47/193 |
| 2016/0309534 A1* | 10/2016 | Teyeb | ..................... | H04L 69/14 |
| 2017/0048074 A1* | 2/2017 | Roeland | ................ | H04W 76/15 |
| 2017/0188407 A1* | 6/2017 | Zee | ......................... | H04L 69/14 |
| 2017/0208104 A1* | 7/2017 | Wei | ......................... | H04L 29/06 |
| 2017/0238215 A1* | 8/2017 | Jin | .......................... | H04W 8/08 |
| | | | | 370/331 |
| 2018/0062979 A1* | 3/2018 | Zee | ........................ | H04W 80/06 |

OTHER PUBLICATIONS

Ford A., et al., "TCP Extensions for Multipath Operation with Multiple Addresses", Internet Engineering Task Force (IETF), Request for Comments: 6824, Category: Experimental, ISSN: 2070-1721, Jan. 2013, 64 pages.

* cited by examiner

FIRST NETWORK NODE AND METHODS THEREIN, FOR DETERMINING WHETHER A SECOND MULTI PATH TRANSMISSION CONTROL PROTOCOL CONNECTION IS TO BE INITIATED

CROSS REFERENCE TO RELATED APPLICATION(S)

This application is a 35 U.S.C. § 371 National Stage of International Patent Application No. PCT/SE2015/050747, filed Jun. 26, 2015, designating the United States, the disclosure of which is incorporated by reference.

TECHNICAL FIELD

The present disclosure relates generally to a first network node and methods therein for determining whether a second Multi Path Transmission Control Protocol connection between the first network node and a second network node is to be initiated. The present disclosure further also relates generally to computer programs and computer-readable storage mediums, having stored thereon the computer programs to carry out these methods.

BACKGROUND

Communication devices such as terminals are also known as e.g. User Equipments (UE), wireless devices, mobile terminals, wireless terminals and/or mobile stations. Terminals are enabled to communicate wirelessly in a cellular communications network, also referred to as wireless communication system, cellular radio system or cellular network. The communication may be performed e.g. between two terminals, between a terminal and a regular telephone and/or between a terminal and a server via a Radio Access Network (RAN) and possibly one or more core networks, comprised within the cellular communications network.

Terminals may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cells, wherein each cell being served by an access node such as a base station, e.g. a Radio Base Station (RBS), which sometimes may be referred to as e.g. "eNB", "eNodeB", "NodeB", "B node", or BTS (Base Transceiver Station), depending on the technology and terminology used. The base stations, based on transmission power and thereby also cell size, may be of different classes such as e.g. a high power eNB such as a macro eNodeB, a low power eNB such as a home eNodeB or pico base station. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the wireless device. The expression Uplink (UL) is used for the transmission path in the opposite direction i.e. from the wireless device to the base station.

In $3^{rd}$ Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

Hybrid Access is a procedure, whereby two, or more, accesses are used to reach a server, e.g., an origin server, from a client.

Multi-Path Transmission Control Protocol (MPTCP), as described for example in https://tools.ietf.org/html/rfc6824, is one technique that may be used to achieve this.

MPTCP is an extension to Transmission Control Protocol (TCP) that may add the capability of simultaneously using multiple paths per single TCP connection. The TCP is a core protocol of the Internet Protocol Suite. It originated in the initial network implementation in which it complemented the Internet Protocol (IP). Therefore, the entire suite is commonly referred to as TCP/IP. TCP may provide reliable, ordered, and error-checked delivery of a stream of octets between applications running on hosts communicating over an IP network. TCP is the protocol that major Internet applications such as the World Wide Web, email, remote administration and file transfer rely on. Each connection, also referred to herein as subflow, may have separate congestion control. In MPTCP, a sequence number on MPTCP level may achieve reliable in-order delivery of packets, in a similar fashion as TCP.

FIG. 1 depicts graphically a comparison of a regular TCP differs with an MPTCP. Both, a TCP and an MPTCP may be associated with an application and a socket Application Programming Interface (API). An application may be understood as a set of computer programs designed to permit the user to perform a group of coordinated functions, tasks, or activities. Application software may not run on itself but is dependent on system software to execute. Examples of an application include a word processor, a spreadsheet design and management system, an aeronautical flight simulator, a console game, a drawing, painting, and illustrating system, or a library management system. A socket API may be understood as an application programming interface, usually provided by the operating system that may allow application programs to control and use network sockets. Internet socket APIs may be usually based on the Berkeley sockets standard. The Internet Protocol (IP) may be understood as the principal communications protocol in the Internet protocol suite for relaying datagrams across network boundaries. Its routing function may enable internet working, and may establish the Internet.

IP may have the task of delivering packets from the source host to the destination host solely based on the IP addresses in the packet headers. For this purpose, IP may define packet structures that encapsulate the data to be delivered. It may also define addressing methods that may be used to label the datagram with source and destination information.

As shown in FIG. 1, while a regular TCP is associated with a single IP address, IPx, in accordance with a first communication technology e.g., IPx may be LTE, in MPTCP every subflow is associated with a respective communication technology. For example, IPx may be LTE and IPy may be, e.g., WLAN/DSL. In the Figure, L1 represents Layer 1. In the seven-layer OSI model of computer networking, the physical layer or layer 1 is the first (lowest) layer. The implementation of this layer is often termed PHY. The physical layer may be understood as comprising the basic networking hardware transmission technologies of a network. It may underlie the logical data structures of the higher level functions in a network. The physical layer may define the means of transmitting raw bits rather than logical data packets over a physical link connecting network nodes. L2 represents Layer 2. In the OSI model of computer networking, the data link layer is layer 2 of seven layers. The data link layer may be understood as the protocol layer that transfers data between adjacent network nodes in a wide area network or between nodes on the same local area network segment. The data link layer may provide the functional and procedural means to transfer data between network entities and might provide the means to detect and possibly correct errors that may occur in the physical layer.

An interesting Hybrid Access use case may be to combine a Digital Subscriber Line (DSL) with LTE, as depicted, for example, in FIG. 2. As shown in the upper half of FIG. 2, when a single, first, connection 211 is used in accordance with a first communication technology, e.g., DSL in this example, transmission rates are of 12.906 kilobits per second (kbit/s) for downloading data from the internet, and 4.844 kbit/s for uploading data to the internet.

As shown in the lower half of FIG. 2, when hybrid access is used, and two connections, are used, a first MPTCP connection 211 in accordance with a first communication technology, e.g., DSL in this example, and a second MPTCP connection 212 in accordance with a second communication technology, e.g., LTE in this example, transmission rates are increased to 24.245 kbit/s for downloading data from the internet, and 7.885 kbit/s for uploading data to the internet. Thus, with hybrid access, higher bandwidth and better resiliency are achieved, which translate into a greatly improved user experience.

The Hybrid Access technology may therefore be used to increase total bandwidth for the end-user.

The architecture to implement Hybrid Access technology to increase total bandwidth for the end-user using MPTCP may look like the example depicted in FIG. 3. As depicted in the example of FIG. 3, a client 301 may set-up a TCP-connection 302, or several TCP, to a Customer Premises Equipment (CPE) 311. The CPE 311 may be understood as a device that may be used for access via cable network. For example, in some embodiments, the CPE 311 may be an enhanced DLS modem that may also include LTE access. One, MPTCP-connection 321 is via a first communication technology, in this case a fixed network 331, e.g., DSL, and the other MPTCP-connection 322 is via a second communication technology, in this case a mobile network 332, e.g., LTE. The CPE 311 may set-up two MPCTP-connections to an MPTCP Proxy 341. An MPTCP Proxy may be understood as a device or node that implements MPTCP functionality such as combining incoming MPTCP flows to one TCP, and sending it further on to its destination. In the example of FIG. 3, the MPTCP Proxy 341 combines the two MPTCP-connections to one TCP-connection 351 to the Origin Server 361.

Neither the Client 331 nor the Origin Server 361 know that up-link and down-link traffic has been sent using MPTCP.

The MPTCP-connection 321 via the first communication technology may be via a Broadband Network Gateway (BNG) 371. The BNG 371, which may also be referred to as a Broadband Remote Access Server (BRAS, B-RAS or BBRAS), may route traffic to and from broadband remote access devices such as Digital Subscriber Line Access Multiplexers (DSLAM) on an Internet Service Provider's (ISP) network.

The other MPTCP-connection 322 via the second communication technology may be via a Packet Data Network Gateway (PGW) 372. The PGW 372 may provide connectivity from a communication device, e.g., a UE, to external packet data networks by being the point of exit and entry of traffic for the communication device. A communication device may have simultaneous connectivity with more than one PGW for accessing multiple Packet Data Networks (PDN). The PGW 372 may perform policy enforcement, packet filtering for each user, charging support, lawful interception and packet screening. Another role of the PGW 372 may be to act as the anchor for mobility between 3GPP and non-3GPP technologies such as WiMAX and 3GPP2, e.g., Code Division Multiple Access (CDMA) 1× and Evolution-Data Optimized (EvDO).

The MPTCP Proxy 341 may be located close to the PGW 372 or the BNG 371 in a backbone network 380 or network backbone, which may be understood as a part of a computer network infrastructure that interconnects various pieces of the network, providing a path for the exchange of information between different Local Area Networks (LANs) or subnetworks. The backbone network 380 may tie together diverse networks in the same building, in different buildings in a campus environment, or over wide areas. Normally, the capacity of the backbone network 380 may be greater than the networks connected to it.

The Policy and Charging Rules Function (PCRF) 390 may be understood as the software node designated in real-time to determine policy rules in a multimedia network. Unlike earlier policy engines that were added onto an existing network to enforce policy, the PCRF may be understood as a software component that may operate at the network core and may access subscriber databases and other specialized functions, such as a charging system, in a centralized manner.

The PCRF 390 may be understood as the part of the network architecture that aggregates information to and from the network operational support systems, and other sources, such as portals, in real time, supporting the creation of rules and then automatically making policy decisions for each subscriber active on the network. Such a network may offer multiple services, quality of service (QoS) levels, and charging rules. The PCRF 390 may provide a network agnostic solution, wire line and wireless, and may also be integrated with different platforms like billing, rating, charging, and subscriber database, or may also be deployed as a standalone entity.

FIG. 4 is a schematic diagram representing the protocol stacks involved in a particular example of the MPTCP-connection 321 via the first communication technology and the other MPTCP-connection 322 via the second communication technology as described in FIG. 3. In this particular example of FIG. 4, the first communication technology is DSL and the second communication technology is LTE. Some of the components of the architecture described in FIG. 3, are also represented in FIG. 4. Each of the client 301 and the Origin Server 361 engage in a TCP and an IP protocol stack. Each of the CPE 311 and the MPTCP Proxy 341 engage in a TCP and a respective IP protocol stack, and an MPTCP and a respective protocol stack. The MPTCP-connection 321, represented as MPTCP2, provides DSL access, and the other MPTCP-connection 322, represented as MPTCP1, provides LTE access. The TCP-connection 302 between the client 301 and the CPE 311 is represented as TCP1, the TCP-connection 351 between the MPTCP Proxy and the Origin Server 361 is represented as TCP4. The MPTCP-connection 321 via the first communication technology is associated with a TCP connection, TCP3, and the other MPTCP-connection 322 via the second communication technology is associated with a TCP connection, TCP2.

While hybrid access may increase total bandwidth for the end-user, existing methods are associated with a high resource usage overhead.

SUMMARY

It is an object of embodiments herein to improve the performance in a wireless communications network by improving the usage of resources in MPTCP connections.

According to a first aspect of embodiments herein, the object is achieved by a method performed by a first network node. The method is for determining whether a second MPTCP connection between the first network node and a second network node is to be initiated. The second MPTCP connection is part of a connection path between a first device and a second device. The second MPTCP connection is in accordance with a second communication technology. The first network node and the second network node have an ongoing first MPTCP connection. The first MPTCP connection is in accordance with a first communication technology. The first network node, the second network node, the first device and the second device operate in a communications network. The first network node determines an amount of resources associated with a usage of the first MPTCP connection. The first network node determines whether the second MPTCP connection is to be initiated, based on whether the determined amount of resources meets a first criterion.

According to a second aspect of embodiments herein, the object is achieved by a first network node configured to determine whether the second MPTCP connection between the first network node and the second network node is to be initiated. The second MPTCP connection is part of the connection path between the first device and the second device. The second MPTCP connection is in accordance with the second communication technology. The first network node and the second network node are configured to have the ongoing first MPTCP connection in accordance with the first communication technology. The first network node, the second network node, the first device and the second device are configured to operate in the communications network. The first network node is further configured to determine the amount of resources associated with the usage of the first MPTCP connection. The first network node is further configured to determine whether the second MPTCP connection is to be initiated, based on whether the determined amount of resources meets the first criterion.

According to a third aspect of embodiments herein, the object is achieved by a computer program, comprising instructions which, when executed on at least one processor, cause the at least one processor to carry out the method performed by the first network node.

According to a fourth aspect of embodiments herein, the object is achieved by computer-readable storage medium, having stored thereon a computer program, comprising instructions which, when executed on at least one processor, cause the at least one processor to carry out the method performed by the first network node.

By determining whether the second MPTCP connection is to be initiated, based on whether the determined amount of resources meets the first criterion, the first network node may only initiate the second MPTCP connection when needed, and otherwise save the resources associated with the initiation and maintenance of the second MPTCP connection.

BRIEF DESCRIPTION OF THE DRAWINGS

Examples of embodiments herein are described in more detail with reference to the accompanying drawings, in which.

DETAILED DESCRIPTION

As part of the solution according to embodiments herein, one or more problems associated with existing methods will first be identified and discussed.

Figure 1:
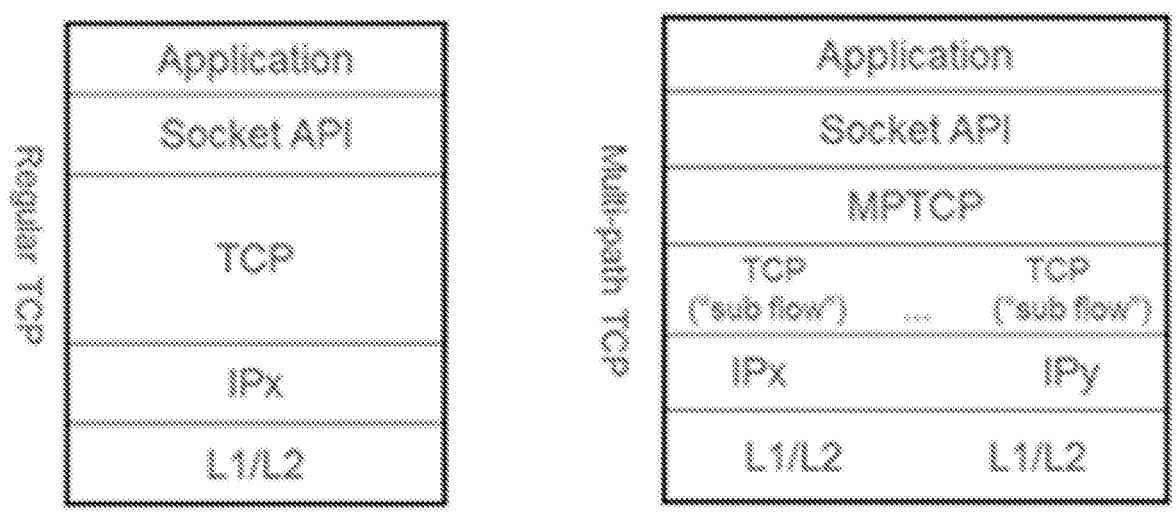
FIG. 1 is a schematic diagram illustrating regular TCP and MPTCP.
Figure 2:
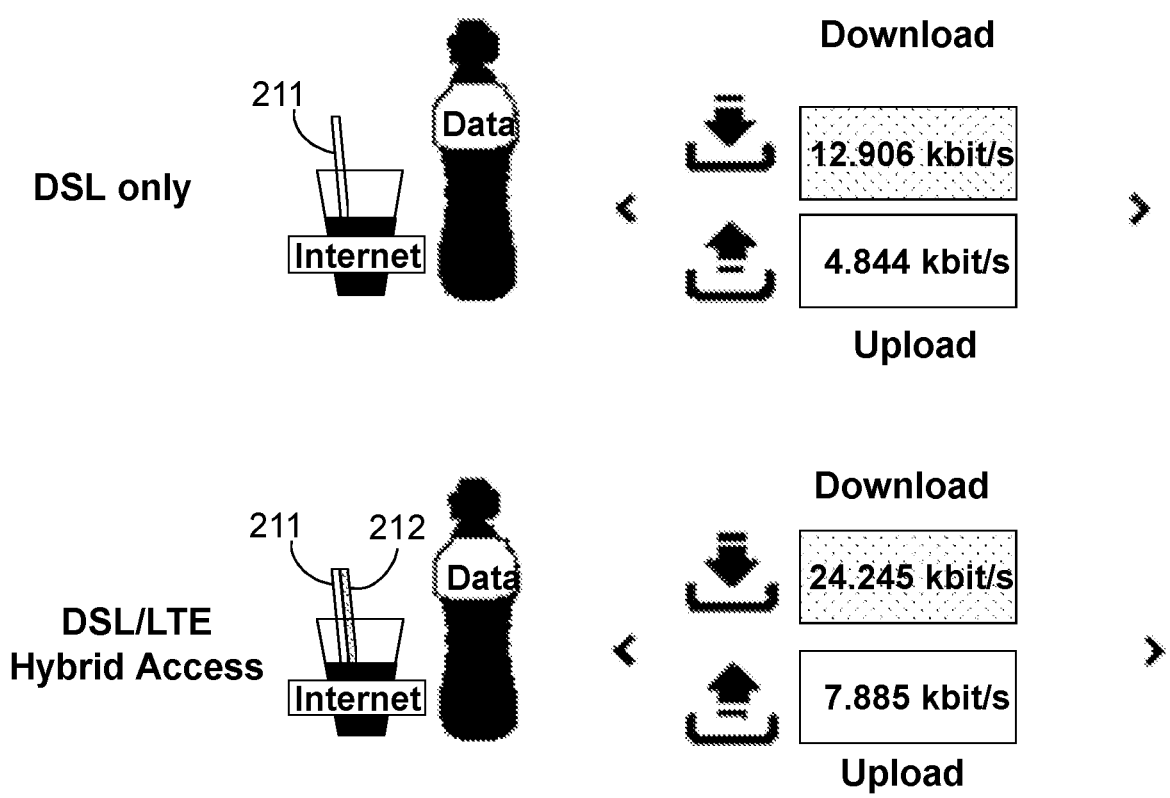
FIG. 2 is a schematic diagram illustrating a hybrid access use case, according to existing methods.
Figure 3:
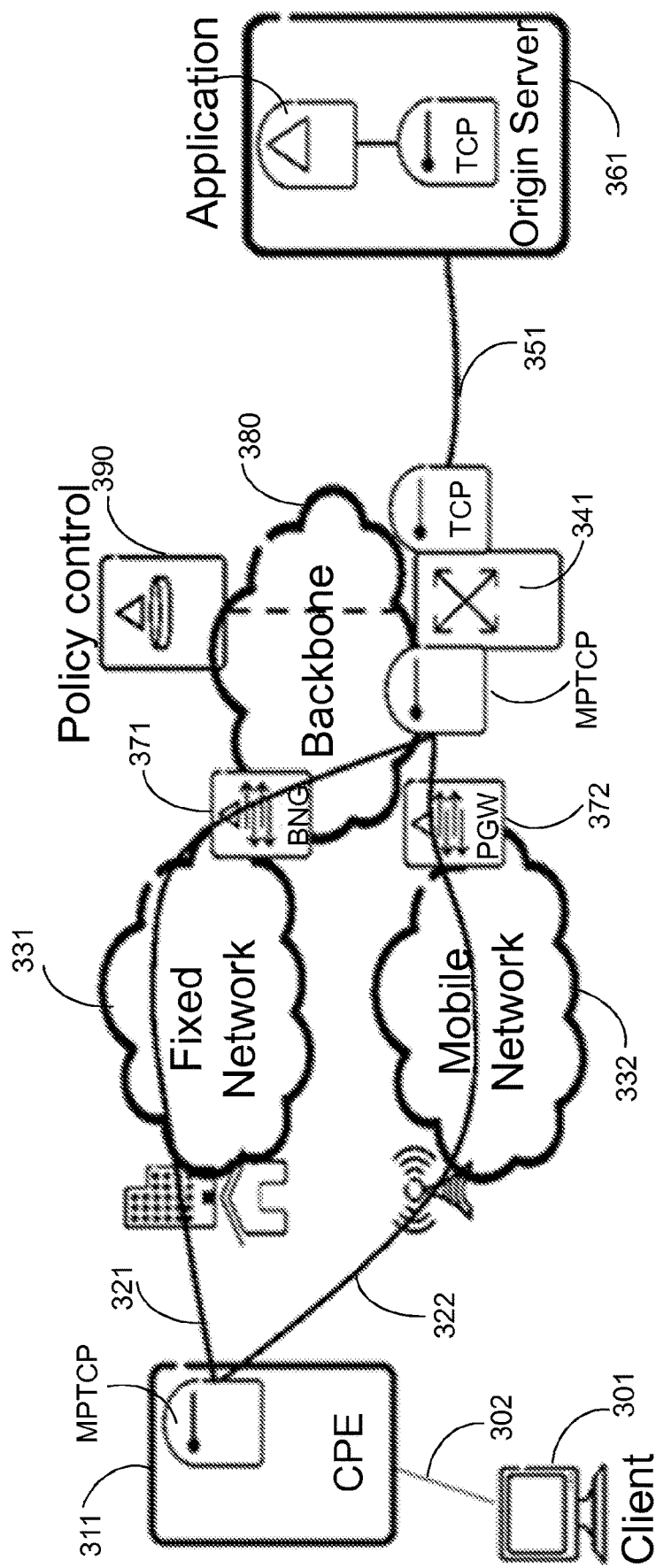
FIG. 3 is a schematic diagram illustrating an example architecture to implement hybrid access MPTCP, according to existing methods.
Figure 4:
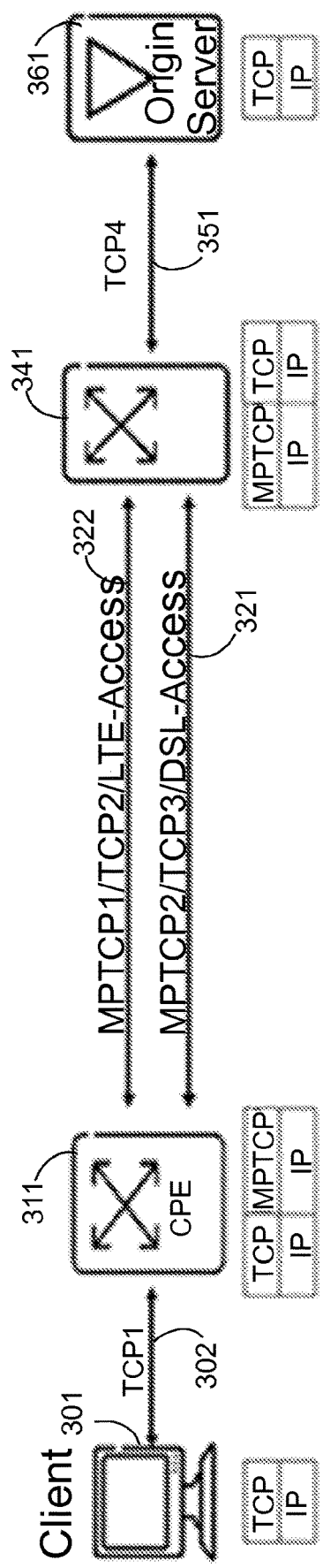
FIG. 4 is a schematic diagram illustrating an example of hybrid access MPTCP, according to existing methods.
Figure 5:
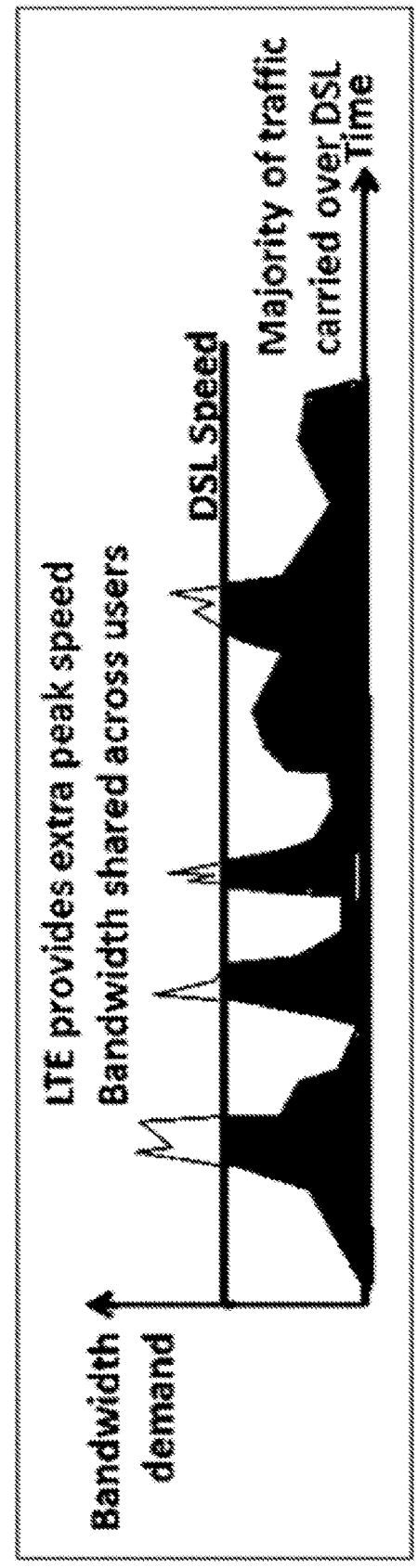
FIG. 5 is a schematic diagram illustrating an example of how to implement hybrid access MPTCP, according to existing methods.

FIG. 5 depicts an example of traffic steering that Hybrid Access may be used for, which will be described in reference to the architecture described earlier for FIG. 3.

While the majority of traffic may be carried over a first communication technology, for example, a fixed network such as DSL, an end-user bandwidth may be able to increase beyond DSL bandwidth capability. For a first TCP-connection 321 from the Client 301, there may be cases where the DSL capability limit, e.g., down-link, indicated in FIG. 5 with a black line, may not be reached. However, the CPE 311 has initiated, at power start-up, a Packet Data Protocol (PDP) Context, for handling TCP on a second communication technology, e.g., LTE, and then initiated a MPTCP-connection 322 on LTE to the MPTCP Proxy 331. This is waste of resources if the down-link of the Client-requested content will not reach DSL bandwidth limit, and all traffic may be handled by the first MPTCP connection 321 alone.

Embodiments herein address the foregoing problems by providing a method that may relate to a dynamic link usage in hybrid access. When there is a demand for more bandwidth, a new Hybrid Access link may be added, using a network initiated PDP Context.

Embodiments will now be described more fully hereinafter with reference to the accompanying drawings, in which examples of the claimed subject matter are shown. The claimed subject matter may, however, be embodied in many different forms and should not be construed as limited to the embodiments set forth herein. Rather, these embodiments are provided so that this disclosure will be thorough and complete, and will fully convey the scope of the claimed subject matter to those skilled in the art. It should also be noted that these embodiments are not mutually exclusive. Components from one embodiment may be tacitly assumed to be present/used in another embodiment.

Note that although terminology from 3GPP LTE has been used in this disclosure to exemplify the embodiments herein, this should not be seen as limiting the scope of the embodiments herein to only the aforementioned system. Other wireless systems, including WCDMA, WiMax, UMB and GSM, may also benefit from exploiting the ideas covered within this disclosure. Thus, also note that terminology such as eNodeB and UE should be considering non-limiting.

Figure 6A:
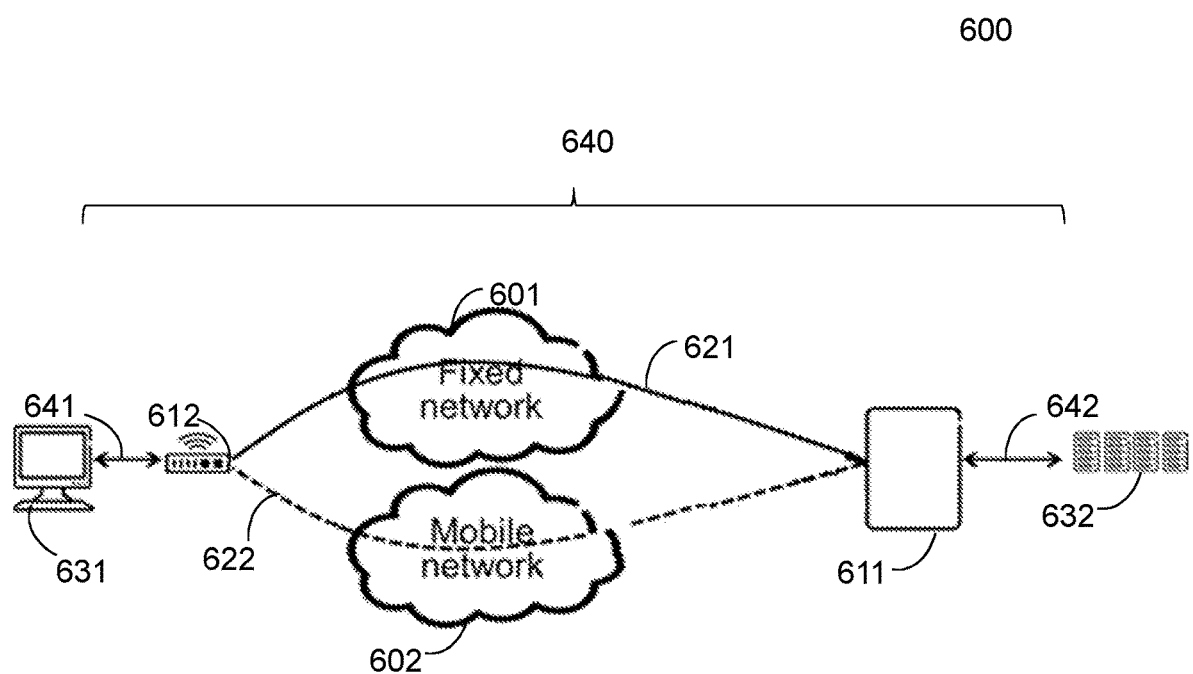
FIG. 6a is a schematic diagram illustrating embodiments in a wireless communications network, according to some embodiments.

FIG. 6a depicts a communications network 600 in which embodiments herein may be implemented. The communications network 600 may comprise two or more networks, of which a fixed network 601 and a mobile network 602 are represented in FIG. 6a. The fixed network 601 may be also referred to as a wired network, or a Public Land Mobile Network (PLMN). An example of the fixed network 601 is a DSL network. Another example of the fixed network 601 is a cable network.

The mobile network 602 may be also referred to as a network with a RAN or a wireless network. The mobile network 602 may for example be any combination of a network such as a Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), Universal Terrestrial Radio Access (UTRA) TDD, Global System for Mobile communications (GSM) network, GSM/Enhanced Data Rate for GSM Evolution (EDGE) Radio Access Network (GERAN) network, EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, WiFi network, Worldwide Interoperability for Microwave Access (WiMax), 2G, 3G, 4G, and/or 5G system or any cellular network or system.

Each of the fixed network 601 and the mobile network 602 may comprise several network nodes. The name of such network nodes may depend on the technology and terminology used.

The communications network 600 comprises a first network node 611, and a second network node 612. Any of the first network node 611 and the second network node 612 may be an MPTCP proxy or a network node of similar functionality to an MPTCP proxy. For simplicity, the description herein refers to an MPTCP proxy only, but it will be understood that a similar description would apply to a node of similar functionality. This functionality refers to converting MPTCP to TCP and vice versa, steering traffic, such as TCP to MPTCP direction, to the different accesses, such as the fixed network 601 and the mobile network 602, throttle traffic, for example, throttle traffic on the mobile network 632, e.g., LTE, to 6 Mbit/s. Any of the first network node 611 and the second network node 612 may also be CPE, which may also be referred to as a Home CPE (HCPE), or a network node of similar functionality to a CPE. For simplicity, the description herein refers to a CPE only, but it will be understood that a similar description would apply to a node of similar functionality. The Customer-premises equipment or customer-provided equipment (CPE) may be understood herein to refer to any terminal and associated equipment located at the premises of a subscriber and connected with a telecommunication channel of a carrier at a demarcation point ("demarc"). The demarc may be understood herein as a point established in a building or complex to separate customer equipment from the equipment located in either the distribution infrastructure or central office of the communications service provider.

CPE may generally refer to devices such as telephones, routers, switches, residential gateways (RG), set-top boxes, fixed mobile convergence products, home networking adapters and Internet access gateways that enable consumers to access services of communications service providers, and distribute them around their house via a local area network (LAN).

However, if the first network node 611 is an MPTCP proxy, the second network node 612 is a CPE, and viceversa: if the first network node 611 is CPE, the second network node 612 is an MPTCP proxy. In the non-limiting example of FIG. 6a, the first network node 611 is an MPTCP proxy, the second network node 612 is a HOPE.

The first network node 611 and the second network node 612 may communicate through a first MPTCP connection 621 in accordance with a first communication technology. In the non-limiting example of FIG. 6a, the first communication technology is a fixed technology, that is, a technology implemented in the fixed network 601.

The first network node 611 and the second network node 612 may also communicate through a second MPTCP connection 622 in accordance with a second communication technology. In the non-limiting example of FIG. 6a, the second communication technology is a mobile technology, that is, a technology implemented in the mobile network 602.

In some particular embodiments, each of the first communication technology and the second communication technology may be a fixed technology. In other embodiments, each of the first MPTCP connection 621, and the second MPTCP connection 622 may be in accordance with the mobile technology.

A number of devices are located in the communications network 600. In the example scenario of FIG. 6a, only two devices are shown: a first device 631, and a second device 632.

The first device 631, also referred to herein as a client, is a wireless communication device such as a UE which is also known as e.g. mobile terminal, wireless terminal and/or mobile station, a mobile telephone, cellular telephone, or laptop with wireless capability, just to mention some further examples. The first device 631 may be, for example, portable, pocket-storable, hand-held, computer-comprised, or a vehicle-mounted mobile device, enabled to communicate voice and/or data, via the RAN, with another entity, such as a server, a laptop, a Personal Digital Assistant (PDA), or a tablet computer, sometimes referred to as a surf plate with wireless capability, Machine-to-Machine (M2M) device, device equipped with a wireless interface, such as a printer or a file storage device, modem, or any other radio network unit capable of communicating over a wired or radio link in a communications system. The first device 631 is enabled to communicate wirelessly in the communication network 600. The communication may be performed e.g., via a RAN and possibly one or more core networks, comprised within the communications network 600.

The second device 632 may be a web server. The webserver may be located in a data center or enterprise. A web server may be understood herein as an information technology that may process requests via Hypertext Transfer Protocol (HTTP), the basic network protocol used to distribute information on the World Wide Web. The term may refer either to the entire computer system, an appliance, or specifically to the software that accepts and supervises the HTTP requests.

The primary function of a web server may be to store, process and deliver web pages to clients. The communication between client and server may take place using the HTTP. Pages delivered may be most frequently HTML documents, which may include images, style sheets and scripts in addition to text content.

The first device 631 may communicate with the second device 632 over a connection path 640, which may be understood to comprise a set of network connections that allow the first device 631 to communicate with the second device 632. As part of the connection path 640, the first device 631 may access any of the fixed network 601 and/or the mobile network 602, via a first connection 641, e.g., a first TCP connection. The first connection 641 connects the first device 631 to the second network node 612. The first connection 641 may be a TCP connection.

Also as part of the connection path 640, the second device 632 may access any of the fixed network 601 and/or the mobile network 602, via a second connection 642, e.g., a second TCP connection. The second connection 642 connects the second device 632 to the first network node 611. The second connection 642 may be a TCP connection.

Therefore, first device 631 may communicate with the second device 632 through a) the fixed network 601 via the first MPTCP connection 621 in accordance with the first communication technology, b) the mobile network 602 via the second MPTCP connection 622 in accordance with the second communication technology, or c) both.

Figure 6B:
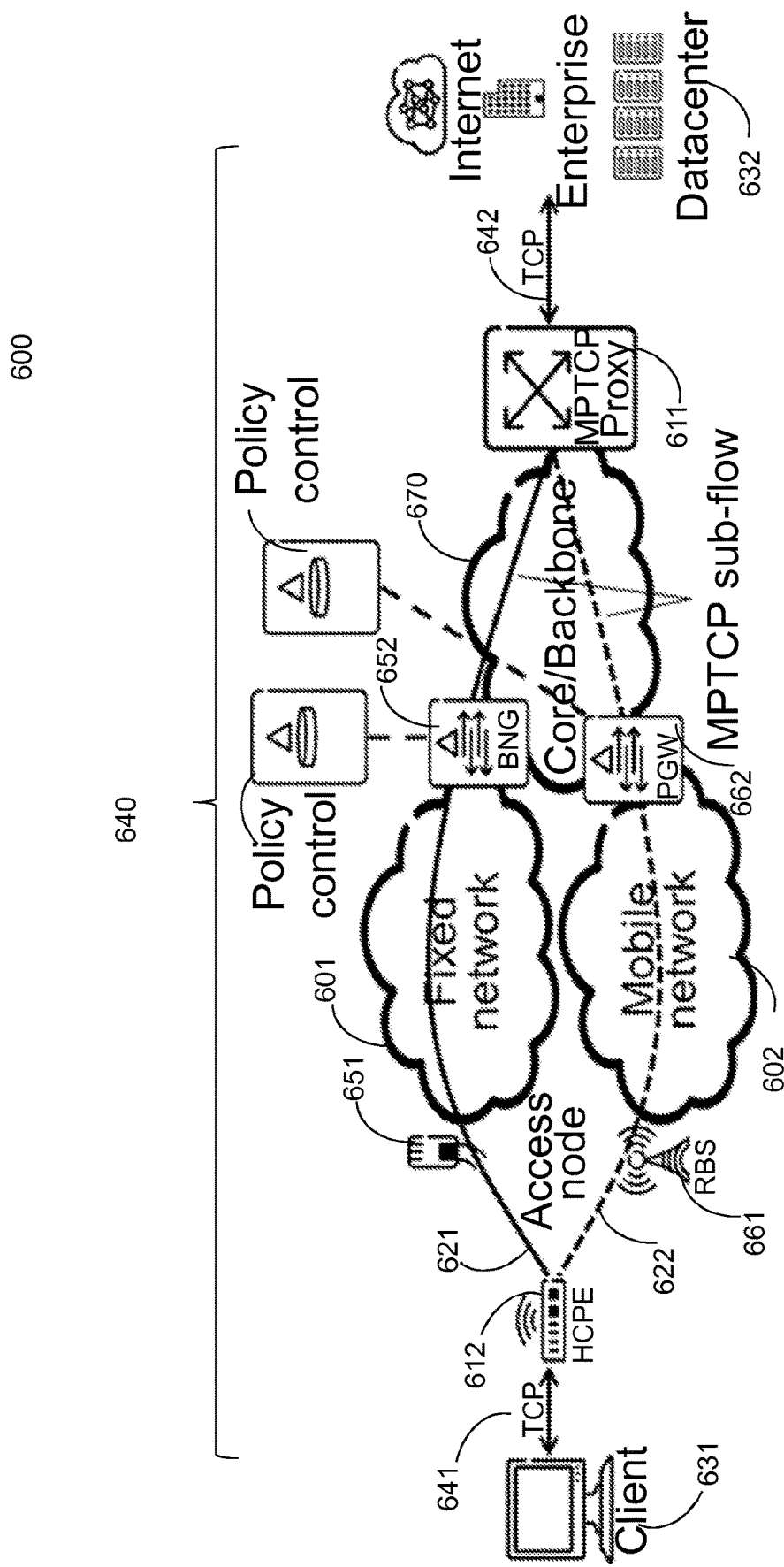
FIG. 6b is a schematic diagram illustrating embodiments in a wireless communications network, according to some embodiments.

FIG. 6*b* depicts a particular non-limiting example of the communications network 600 in which embodiments herein may be implemented. The description of FIG. 6*b* is the same as that provided above in reference to FIG. 6. In addition, some further details that the communications network 600 may have are provided. The fixed network 601 may comprise several network nodes, although only some network nodes are represented in FIG. 6*b* to simplify it. The name of such network nodes may depend on the technology and terminology used. Such a network node is an Access node 651, depicted in FIG. 6*b*. An access node 651 may be understood as a node that manages access to the fixed network 601. The access node 651 may be, for example, a Digital Subscriber Line Access Multiplexer (DSLAM). A DSLAM may be understood as a network device, often located in telephone exchanges, that may connect multiple customer DSL interfaces to a high-speed digital communications channel using multiplexing techniques. The fixed network 601 may also comprise a Broadband Network Gateway (BNG) 652, as described earlier. The BNG 652 may be in charge of the policy control of the fixed network 601.

The mobile network 602 may comprise several network nodes, although only some network nodes are represented in the Figure to simplify it. The name of such network nodes may depend on the technology and terminology used. Such a network node is a Radio Base Station (RBS) 661 depicted in FIG. 6. The mobile network 602 may also comprise a Packet Data Network GateWay (PGW) 662, as described earlier. The PGW 662 may be in charge of the policy control of the mobile network 602. The fixed network 601 and mobile network 602 may share at least some nodes and/or hardware components as part of a core network or backbone 670, as described earlier. The core network or backbone 670 may be, for example, an IP network.

The RBS 661 may be a base station such as e.g. an eNB, eNodeB, or a Home Node B, a Home eNode B, femto Base Station, BS, or any other network unit capable to serve a wireless device or a machine type communication device in the communications network 600. The RBS 661 may be a high power eNB such as a macro eNodeB, or a low power eNB such as a pico base station, based on transmission power and thereby also cell size. In some particular embodiments, the RBS 651 may be a stationary relay node or a mobile relay node.

Embodiments of a method performed by the first network node 611 for determining whether a second MPTCP connection 622 between the first network node 611 and the second network node 612 is to be initiated, will now be described with reference to the flowchart depicted in FIG. 7. The second MPTCP connection is part of the connection path 640 between the first device 631 and the second device 632. The second MPTCP connection 622 is in accordance with the second communication technology. In accordance with the second communication technology may be understood herein as "based on", or "set up in accordance to". The first network node 611 and the second network node 612 have an ongoing first MPTCP connection 621. The first MPTCP connection 621 is in accordance with the first communication technology. The first network node 611, the second network node 612, the first device 631 and the second device 632 operate in the communications network 600.

In some embodiments, the first network node 611 is a MPTCP Proxy, and the second network node 612 is a CPE.

In other embodiments, the first network node 611 is a CPE, and the second network node 612 is an MPTCP Proxy.

In some embodiments, the second communication technology is a mobile technology, and wherein the first communication technology is a fixed technology.

Each of the second MPTCP connection 622 first MPTCP connection 621 may also be referred to herein as a subflow.

Figure 7:
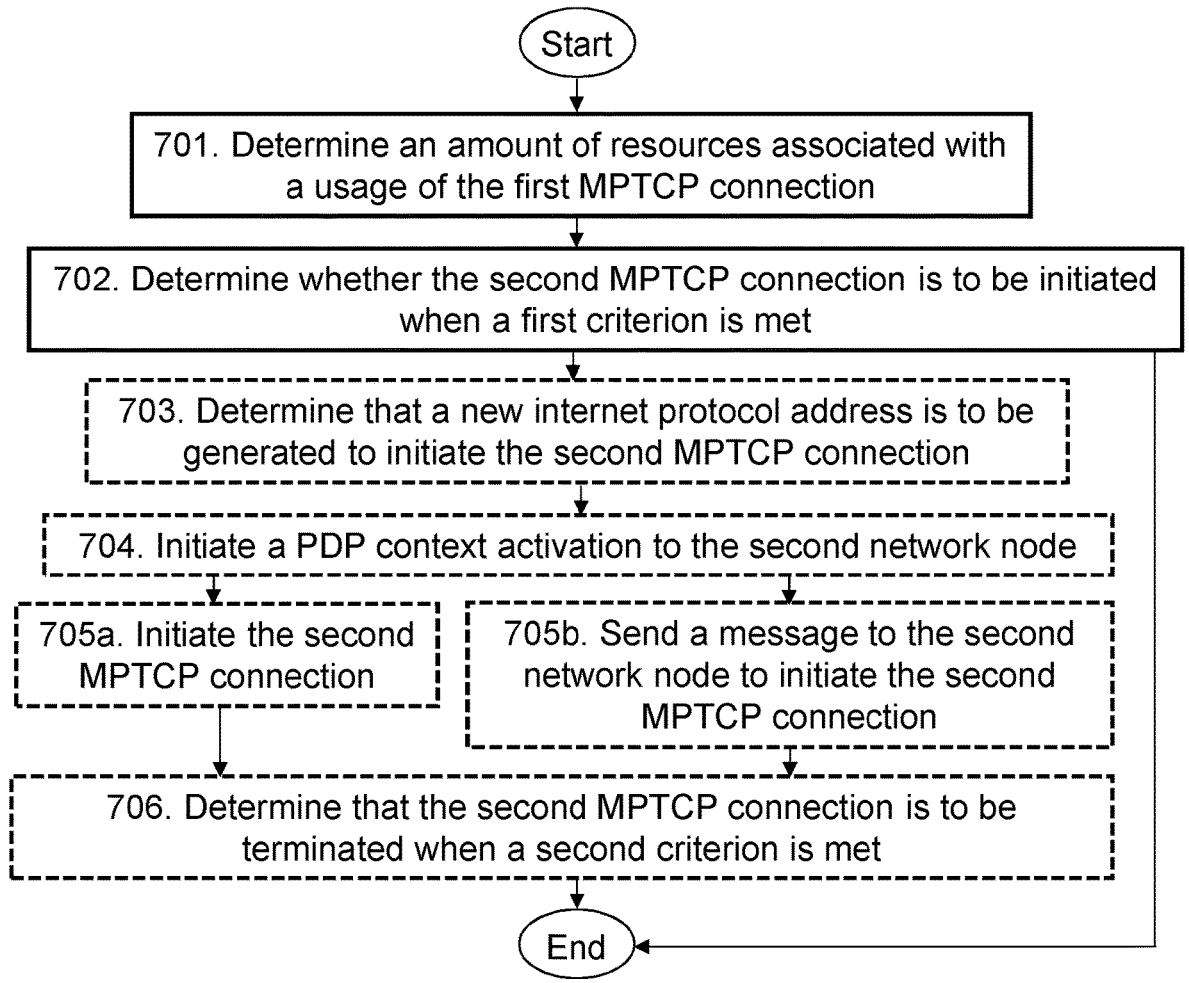
FIG. 7 is a schematic diagram illustrating embodiments of a method in a first network node, according to some embodiments.

FIG. 7 depicts a flowchart of the actions that are or may be performed by the first network node 611 in embodiments herein. A dashed line depicts an optional action.

The method may comprise the following actions, which actions may as well be carried out in another suitable order than that described below.

Action 701

In order to evaluate the need to initiate the second MPTCP connection 622, the first network node 611 first determines an amount of resources associated with a usage of the first MPTCP connection 621. This action may enable the first network node 611 to assess or calculate how saturated the resources of the first MPTCP connection 621 are.

Resources associated with the usage of the first MPTCP connection 621 may refer herein to, for example, a buffer level, a sending rate, or a Round-Trip Time (RTT). The sending rate may be understood as the Megabits per second (Mbit/s) that may be sent to the second network node 612. The name of the resources may depend on the technology used.

The determining of the amount of resources may be implemented by calculating buffer measurements, or the RTT.

The RTT may be estimated in TCP by:
$RTT=(\alpha \cdot Old\_RTT)+((1-\alpha) \cdot New\_Round\_Trip\_Sample)$, where $\alpha$ is constant weighting factor ($0 \leq \alpha < 1$). Choosing a value $\alpha$ close to 1 may make the weighted average immune to changes that last a short time, e.g., a single segment that encounters long delay. Choosing a value for $\alpha$ close to 0 may make the weighted average respond to changes in delay very quickly. This may be improved by the Jacobson/Karels algorithm, which takes standard deviation into account as well.

Once a new RTT is calculated, it may be entered into the equation above to obtain an average RTT for that connection, and the procedure may continue for every new calculation.

The sender, e.g., the first network node 611 as an MPTCP, may get notified when the buffer in TCP for the first MPTCP connection 621 is full.

Action 702

In this action, the first network node 611, determines whether the second MPTCP connection 622 is to be initiated, based on whether the determined amount of resources, in Action 701, meets a first criterion.

By initiating the second MPTCP connection 622 it is meant herein to set up a new MPTCP connection, different from the first MPTCP connection 621. The second MPTCP connection 622 may be related or tied to the first MPTCP connection 621.

In some embodiments, the first criterion may be a threshold. The threshold may be configured by an operator of the first network node 611. For example a threshold above which, the first MPTCP connection 621 is considered to be saturated. In the embodiments wherein the first criterion is a threshold, the determining 702 whether the second MPTCP connection 622 is to be initiated, based on whether the determined amount of resources meets the first criterion may further comprise determining whether the determined amount of resources exceeds the threshold. The determining 702 of whether the second MPTCP connection 622 is to be initiated may comprise determining that the second MPTCP connection 622 is to be initiated when the determined amount of resources exceeds the threshold. In other words, the first network node 611 may determine that the second MPTCP connection 622 is to be initiated when the first MPTCP connection 621 is considered to be saturated. When the determined amount of resources does not exceed the threshold, the first network node 611 may determines that the second MPTCP connection 622 is not to be initiated, in order to save any resources that may be associated with the initiation of the second MPTCP connection 622.

In other embodiments, the first criterion may be, for example, a function that may take into account one or more variables, such as interference, priority values of the first device 631, number of users in the mobile network 602, availability of resources in the mobile network 602, etc . . . , as e.g., configured by an operator of the first network node 611. In other words, the first criterion may not be a single value, but a function. In some embodiments, the function may model observed values and may output a predicted value for usage of the resources, instead of an observed value at a particular time point.

Once the first network node 611 has determined that the second MPTCP connection 622 is to be initiated, the second MPTCP connection 622 may then be initiated by the first network node 611 autonomously, or by the second network node 612, as described later, in reference to Actions 705*a* and 705*b*.

Action 703

In order to be able to address the second network node 612 over a new access network, e.g., the mobile network 602, in this action, the first network node 611 may determine that a second internet protocol address is to be generated to initiate the second MPTCP connection 622, wherein the ongoing first MPTCP connection 621 is associated with a first internet protocol address. The first network node 611 may determine that the second internet protocol address is to be generated upon determining that the second MPTCP connection 622 is to be initiated in Action 702.

By generating a second internet protocol address, the first network node 611 may then be able to address the second network node 612, and send packets to the second network node 612 using IP.

Action 704

In order to provide an IP-address on the new access network, the mobile network 602 in this case, to the second network node 612, the first network node 611 may initiate a Packet Data Protocol, PDP, context activation to the second network node 612 when the first network node 611 determines that a second internet protocol address is to be generated to initiate the second MPTCP connection 622.

By initiating the PDP context activation to the second network node 612, the second network node 612 may register to the new access network, the mobile network 602 in this case, and be given an IP-address that is used in that new access network.

In some embodiments, the first network node 611 may initiate the context activation to the second network node 612 autonomously, e.g., via a PCRF in the core network 670, as will be later described in an example in FIGS. 9*a*, 9*b* and 9*c*.

In other embodiments, the first network node 611 may initiate the context activation to the second network node 612 by sending a message, e.g., a HTTP request, to the second network node 612, and by doing so ask the second network node 612 to initiate the PDP Context Activation.

Action 705*a*

Once the first network node 611 has determined that the second MPTCP connection 622 is to be initiated, the first network node 611 may initiate or start the second MPTCP connection 622 itself. Thus, in this action, the first network node 611 may initiate the second MPTCP connection 622, based on the determining of whether the second MPTCP connection 622 is to be initiated. That is, upon determining that the second MPTCP connection 622 is to be initiated, the first network node 611 may initiate the second MPTCP connection 622. In some embodiments, the first network node 611 may initiate the second MPTCP connection 622 when the determined amount of resources in the first MPTCP connection 621 meets the first criterion, e.g., when the first MPTCP connection 621 is saturated.

The initiating of the second MPTCP connection 622 may be performed after a new internet protocol address has been generated to initiate the second MPTCP connection 622, as described in Action 703.

If the first network node 611 determines in Action 702 that the second MPTCP connection 622 is not to be initiated, the first network node 611 will not initiate the second MPTCP connection 622.

Action 705*a* is an optional action. In an alternative embodiment, the second network node 612 may initiate the second MPTCP connection 622 by sending a message, e.g., an MPTCP Join message, to the first network node 611. The second MPTCP connection 622 may be correlated with the ongoing first MPTCP connection 621.

In this alternative embodiment, as will be later described in the example of FIGS. 9*a*, 9*b* and 9*c*, the second network node 612 may automatically send the MPTCP Join message when it detects the new access network, for example, when it detects the second internet protocol address.

Action 705*b*

In an alternative embodiment, the first network node 611 may send a message to the second network node 612, the message comprising an instruction to initiate the second MPTCP connection 622, after determining that the second MPTCP connection 622 is to be initiated. An example of such a message may be, for example an HTTP request sent over the fixed network 601 to the second network node 612. The second network node 612 may comprise a web server that may handle the request and interpret the request, and may conclude that a new access network should be attached. The second network node 612 may initiate a PDP Context Activation on the mobile network 602.

Action 706

In order to avoid wastage of resources, e.g., radio resources, in the mobile network 602, in this action, the first network node 611 may, e.g., periodically, determine whether the second MPTCP connection 622 is to be terminated after the second MPTCP connection 622 has been initiated, based on a second criterion.

The second criterion, or exit criterion, may be defined in a similar manner as the first criterion. That is, the second criterion may be a threshold or a function. When the resources used by the second MPTCP connection 622 are below a certain threshold, or adjust to a specified function, the first network node 611 may decide to terminate the second MPTCP connection 622, and this way free up resources in the mobile network 602 that would otherwise be used by maintaining the second MPTCP connection 622.

An advantage of embodiments herein is the possibility to avoid un-needed usage of the mobile network 602, e.g. LTE resources for the fixed network 601/mobile network 602, e.g., DSL/LTE, hybrid access, but at the same time have the possibility to offer increased bandwidth to users of the fixed network 601. The method performed by the first network node 611 allows that the initiation of the second MPTCP connection 622, is only performed when necessary, according to a criterion based on traffic demands. That is, the second MPTCP connection 622 is only initiated on a need-to basis.

Figure 8:
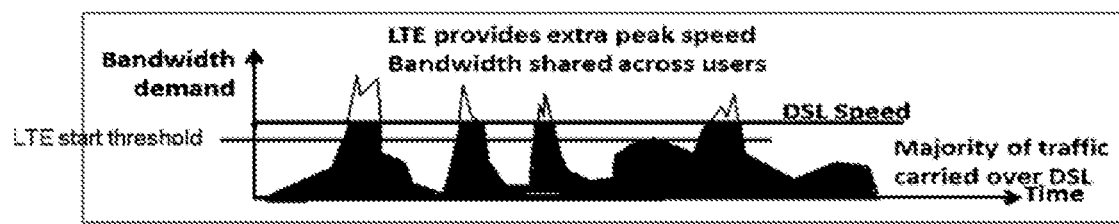
FIG. 8 is a schematic diagram illustrating embodiments of a method in a first network node, according to some embodiments.

FIG. 8 is a schematic diagram depicting a non-limiting example of bandwidth demand between the first network node 611 and the second network node 612, over time. The top horizontal bar marks the maximum speed limit for the first communication technology. Below the top horizontal bar, in black, it is shown that the majority of the traffic between the first network node 611 and the second network node 612 is carried over the first MPTCP connection 621 in accordance with the first communication technology, DSL in this case. The second communication technology, LTE in this case, provides the extra peak speed. The second horizontal bar marks what in this case is the first criterion that when exceeded, will trigger the first network node 611 to determine that the second MPTCP connection 622 is to be initiated. In this particular example, the first criterion is referred to as the LTE start threshold. Otherwise, the second MPTCP connection 622 is not initiated, and the resources that would be devoted to it are therefore spared.

To summarize the above method with a particular example, embodiments herein address the foregoing problems by providing a method whereby the first network node 611, e.g., an MPTCP Proxy, is able to determine the level of bandwidth on the first MPTCP connection 621, e.g., the DSL-link in this case, through e.g., RTT/buffer measurements. If the first network node 611 finds that the threshold "LTE start threshold" is exceeded, then the first network node 611 will initiate a network initiated PDP Context Activation to the second network node 612, a CPE.

According to the embodiments performing Action 705*b*, the CPE may then initiate the second MPTCP connection 622, a new MPTCP-connection, to the MPTCP Proxy, on the LTE. The MPTCP Proxy may use this new access to send content to CPE/Client.

Figure 9A:
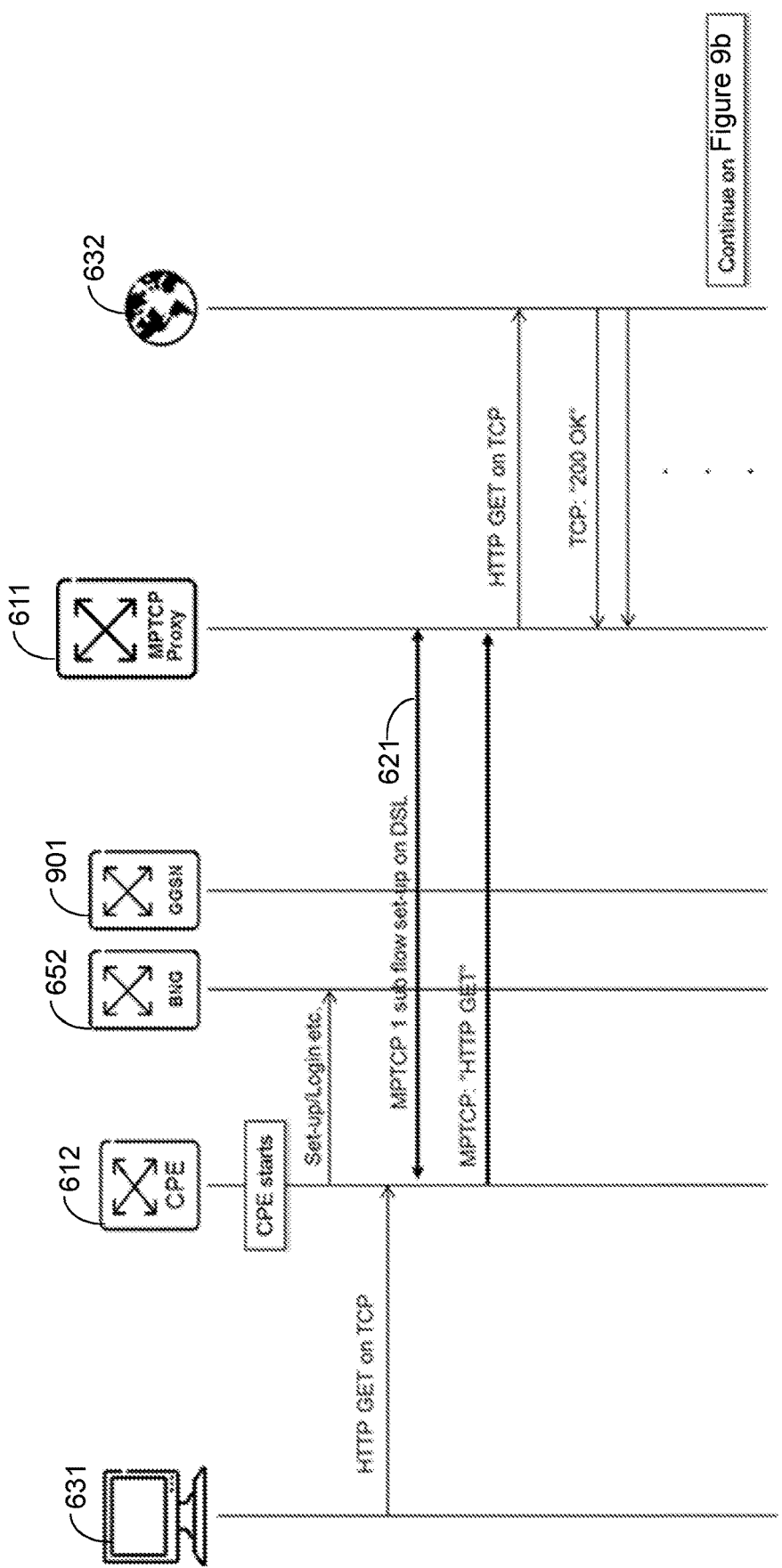
FIG. 9a is a schematic diagram illustrating embodiments of a method in a first network node, according to some embodiments.
Figure 9B:
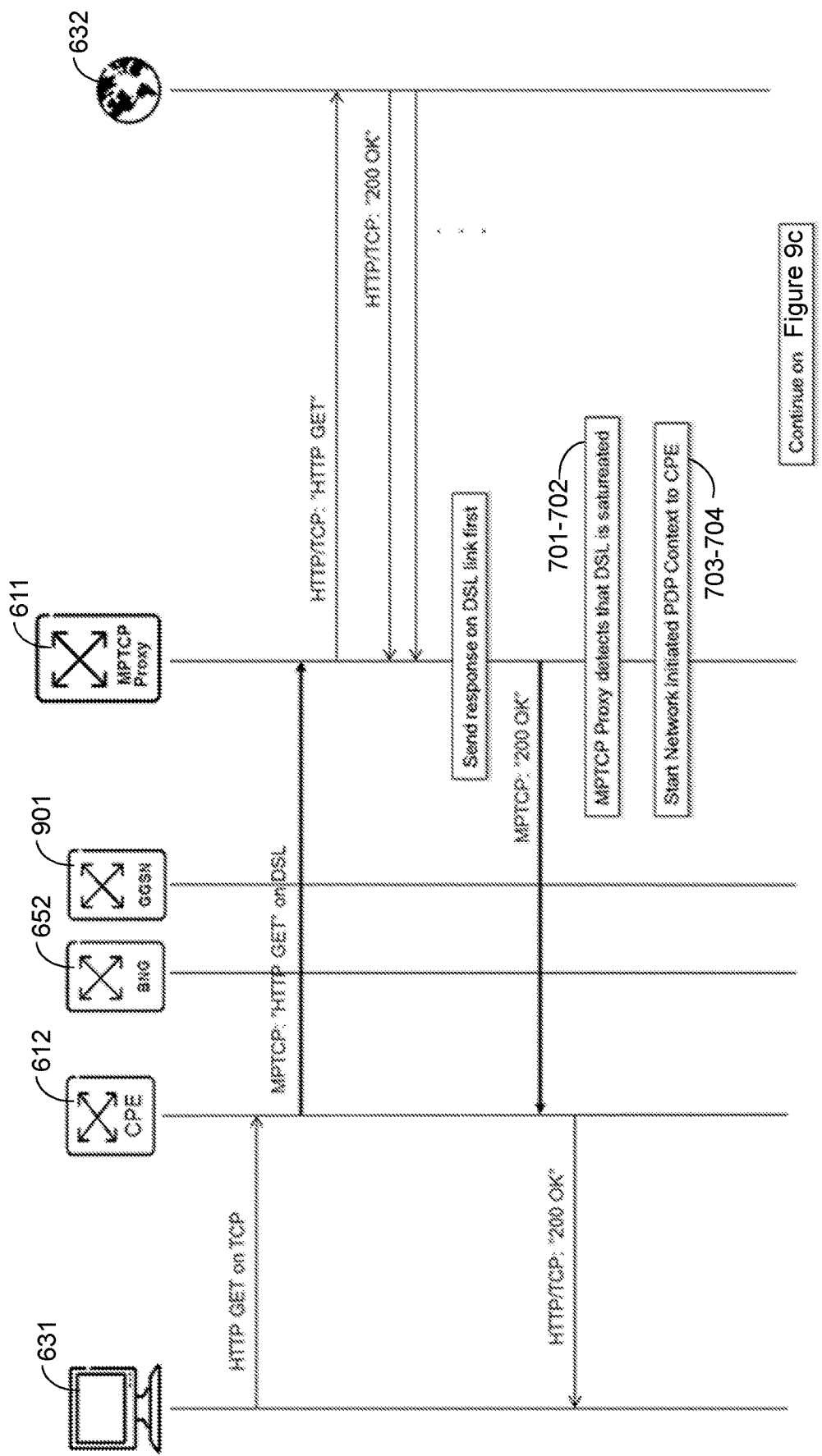
FIG. 9b is a schematic diagram illustrating embodiments of a method in a first network node, according to some embodiments.
Figure 9C:
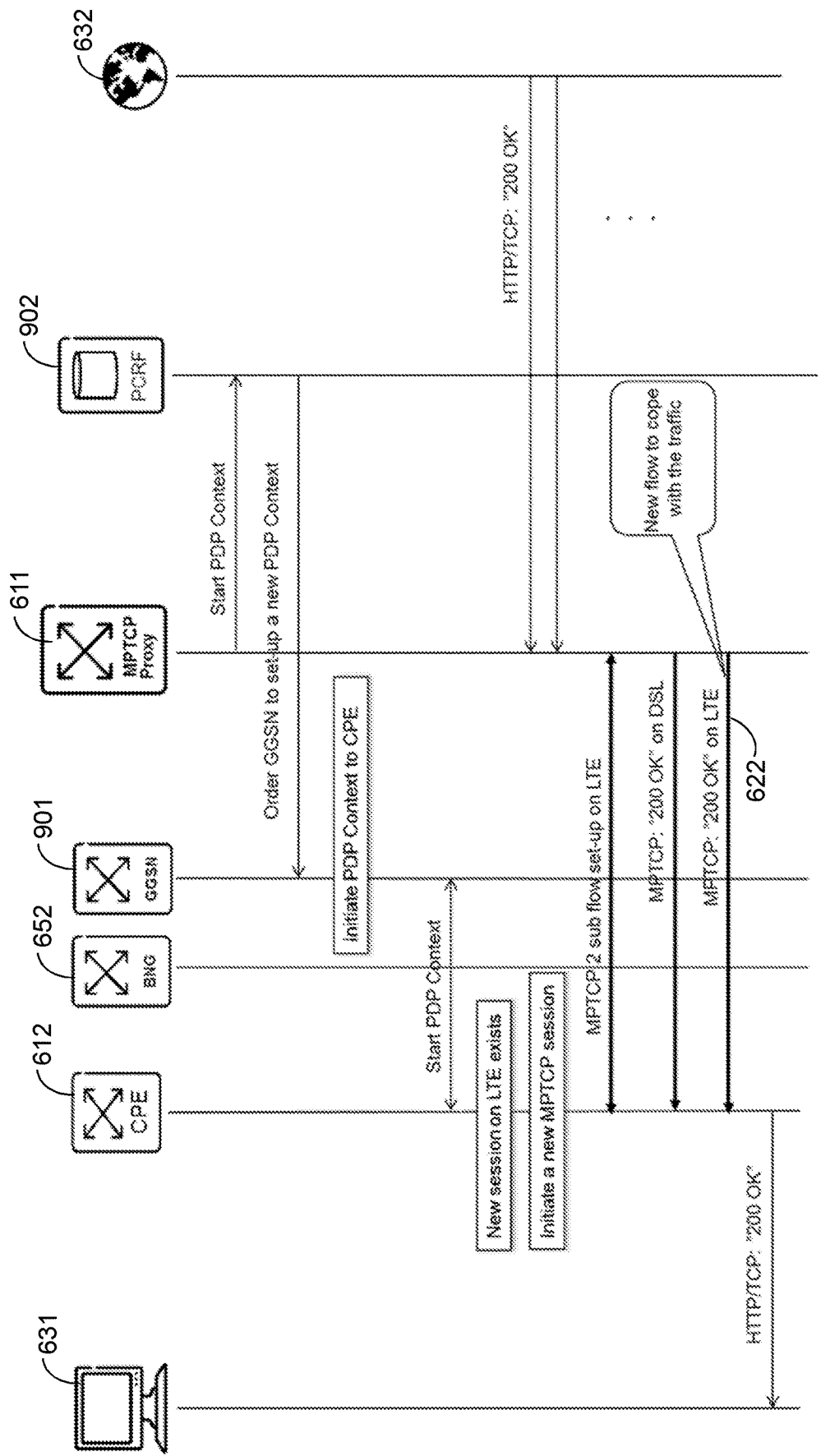
FIG. 9c is a schematic diagram illustrating embodiments of a method in a first network node, according to some embodiments.

FIGS. 9*a*, 9*b*, and 9*c* are each a schematic diagram of a non-limiting example of the actions that may be performed in the communications network 600 for determining whether the second MPTCP connection 622 between the first network node 611 and the second network node 612 is to be initiated, and for initiating the second MPTCP connection 622, as part of the connection path 640 between the first device 631 and the second device 632. FIG. 9*a* illustrates how when the second network node 612, a CPE in this example, starts, it may register itself to the fixed network 601 by sending set-up, login messages, etc . . . to the BNG 652. The first device 631 may send an HTTP request on TCP to the second network node 612. The second network node 612 may set-up the first MPTCP connection 621, also referred to as MPTCP1 subflow, on the fixed network 601, with the first network node 611. The fixed network 601 is a DSL network in this example. The second network node 612 may then send the HTTP request on that access to the first network node 611. The first network node 611, an MPTCP proxy in this example, may receive the request and then set-up a new TCP connection to the second device 632, which is not represented in FIG. 9A. The first network node 611 may then then send the HTTP Get request to the second device 632, and receive an acknowledgement from the second device 632, if successful. A Gateway General Packet Radio Service Support Node (GGSN) 901 is also represented in the Figure, and will be further described in FIG. 9*c*. The GGSN 901 may be understood as a network node that may act as a gateway between a General Packet Radio Service (GPRS) wireless data network and other networks. The GGSN 901 may store subscriber data received from the Home Location Register (HLR) and the Serving GPRS Support Node (SGSN), as well as the address of the SGSN where each mobile station is registered.

FIG. 9*b* illustrates the continuation of FIG. 9*a*. The first actions in FIG. 9*b*, up to the suspensive points, are repeated from FIG. 9*a*, and therefore will not described again here. The first network node 611 may send the response on the fixed network 601. Therefore, the first network node 611 may send incoming TCP from the second device 632 to the second network node 612 by using the earlier established, ongoing, first MPTCP connection 621. According to Action 701, the first network node 611 may determine the amount of resources associated with the usage of the first MPTCP connection 621. Through Action 701, the first network node 611 may detect that the fixed network 601 may reach its limits, that is be saturated. According to Action 702, the first network node 611 may determine that the second MPTCP connection 622 is to be initiated. According to Action 704, the first network node 611 may initiate a PDP Context activation to the second network node 612, when the first network node 611 determines that a second internet protocol address is to be generated to initiate the second MPTCP connection 622.

FIG. 9c illustrates the continuation of FIG. 9b. According to Action 704, the first network node 611 may initiate the PDP Context activation to the second network node 612 by sending a message to a PCRF 902, as described earlier. The PCRF 902 may be located in the core network 670, close to the PGW 662 and the GGSN 901. Alternatively, the first network node 611 may initiate the PDP Context activation to the second network node 612 by sending a HTTP request to the second network node 612 over the fixed network 601 to request the second network node 612 to initiate the PDP Context Activation. This alternative is not depicted in FIG. 9c. The PCRF 902 may then order the GGSN 901 in the mobile network 602 to start a PDP Context activation to the second network node 612. The GGSN 901 may then, upon receiving the order to initiate the PDP Context to the second network node 612, start the PDP Context to the second network node 612 from the GGSN 901. In this particular example of FIG. 9c, and as described earlier, when the second network node 612 detects that a new access network is up, that is, that the mobile network 602 is up, it may autonomously initiate the second MPTCP connection 622 by issuing an MPTCP Join message, represented in FIG. 9c as MPTCP2 sub flow set-up on LTE. The data may now be sent from the second device 632 to the first device 631 via the first network node 611, as represented in FIG. 9c by the arrows HTTP/TCP '200 OK'. The first network node 611 may now send MPTCP packets on the new access network, the mobile network 602 via the second MPTCP connection 622, as well as on the first MPTCP connection 621.

The second MPTCP connection 622 therefore provides a new flow to cope with the traffic between the first device 631 and the second device 632.

To perform the method actions described above in relation to FIGS. 7-9c, the first network node 611 is configured to determine whether the second MPTCP connection 622 between the first network node 611 and the second network node 612 is to be initiated.

Figure 10:
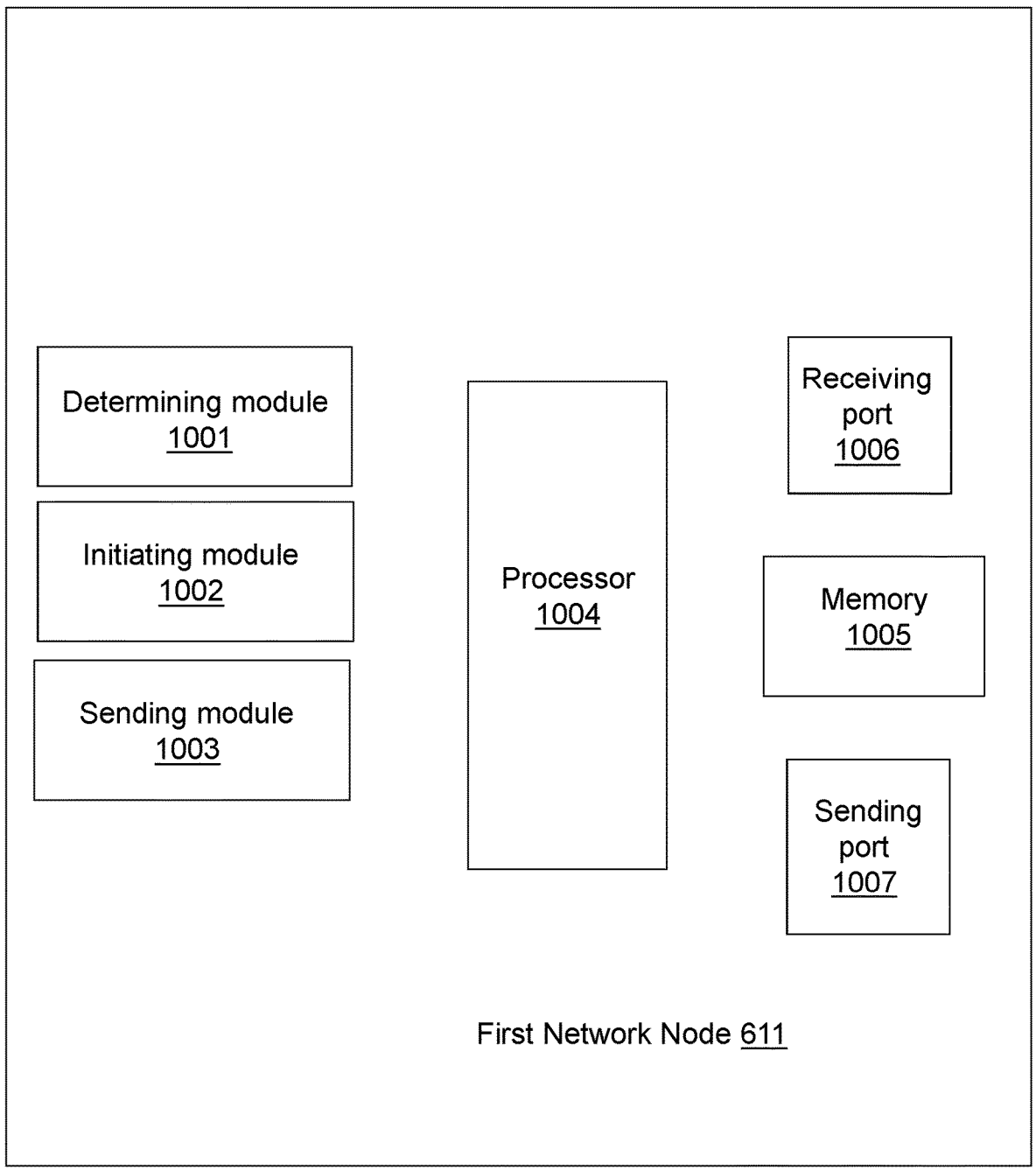
FIG. 10 is a schematic block diagram illustrating embodiments of a first network node, according to embodiments herein.

The first network node 611 may comprise the following arrangement depicted in FIG. 10. As already mentioned, the second MPTCP connection is a part of the connection path 640 between the first device 631 and the second device 632. The second MPTCP connection 622 is in accordance with the second communication technology. The first network node 611 and the second network node 612 are configured to have an ongoing first MPTCP connection 621 in accordance with the first communication technology. The first network node 611, the second network node 612, the first device 631 and the second device 632 are configured to operate in the communications network 600.

The detailed description of some of the following corresponds to the same references provided above, in relation to the actions described for the first network node 611, and will thus not be repeated here.

For example, in some embodiments, the first network node 611 is a MPTCP Proxy, and the second network node 612 is a CPE. In some embodiments, the first network node 611 is a CPE, and the second network node 612 is an MPTCP Proxy.

Also, in some embodiments the second communication technology may be a mobile technology, and the first communication technology may be a fixed technology.

The first network node 611 is further configured to, e.g., by means of a determining module 1001 configured to, determine the amount of resources associated with the usage of the first MPTCP connection 621.

The determining module 1001 may be a processor 1004 of the first network node 611, or an application running on such processor.

The first network node 611 is further configured to, e.g., by means of the determining module 1001 configured to, determine whether the second MPTCP connection 622 is to be initiated, based on whether the determined amount of resources meets the first criterion.

In some embodiments, wherein the first criterion is a threshold, to determine whether the second MPTCP connection 622 is to be initiated, based on whether the determined amount of resources meets the first criterion may comprise to determine whether the determined amount of resources exceeds the threshold. In these embodiments, to determine whether the second MPTCP connection 622 is to be initiated may comprise to determine that the second MPTCP connection 622 is to be initiated when the determined amount of resources exceeds the threshold.

The first network node 611 may be further configured to, e.g., by means of the determining module 1001 configured to, determine that the second internet protocol address is to be generated to initiate the second MPTCP connection 622, wherein the ongoing first MPTCP connection 621 is associated with the first internet protocol address.

The first network node 611 may be further configured to, e.g., by means of the determining module 1001 configured to, determine whether the second MPTCP connection 622 is to be terminated after the second MPTCP connection 622 has been initiated, based on the second criterion.

In some embodiments, the first network node 611 may be further configured to, e.g., by means of an initiating module 1002 configured to, initiate the PDP context activation to the second network node 612 when the first network node 611 determines that the second internet protocol address is to be generated to initiate the second MPTCP connection 622.

The initiating module 1002 may be the processor 1004 of the first network node 611, or an application running on such processor.

In some embodiments, the first network node 611 may be further configured to, e.g., by means of the initiating module 1002 configured to, initiate the second MPTCP connection 622, based on the determination that the second MPTCP connection 622 is to be initiated based on the determined amount of resources meeting the first criterion, wherein the initiating of the second MPTCP connection 622 is configured to be performed after a new internet protocol address has been generated to initiate the second MPTCP connection 622.

The initiating module 1002 may be the processor 1004 of the first network node 611, or an application running on such processor.

The first network node 611 may be further configured to, e.g., by means of a sending module 1003 configured to, send the message to the second network node 612, the message comprising an instruction to initiate the second MPTCP connection 622, after the determination that the second MPTCP connection 622 is to be initiated based on the determined amount of resources meeting the first criterion.

The sending module 1003 may be the processor 1004 of the first network node 611, or an application running on such processor.

The embodiments herein for determining whether the second MPTCP connection 622 between the first network node 611 and the second network node 612 is to be initiated may be implemented through one or more processors, such as the processor 1004 in the first network node 611 depicted in FIG. 10, together with computer program code for performing the functions and actions of the embodiments herein. The program code mentioned above may also be provided as a computer program product, for instance in the form of a data carrier carrying computer program code for performing the embodiments herein when being loaded into the in the first network node 611. One such carrier may be in the form of a CD ROM disc. It is however feasible with other data carriers such as a memory stick. The computer program code may furthermore be provided as pure program code on a server and downloaded to the first network node 611. As indicated above, the processor 1004 may comprise one or more circuits, which may also be referred to as one or more modules in some embodiments, each configured to perform the actions carried out by the first network node 611, as described above in reference to FIGS. 7-9c, e.g., the determining module 1001, the initiating module 1002, and the sending module 1003. Hence, in some embodiments, the determining module 1001, the initiating module 1002, and the sending module 1003 described above may be implemented as one or more applications running on one or more processors such as the processor 1004. That is, the methods according to the embodiments described herein for the first network node 611 may be respectively implemented by means of a computer program product, comprising instructions, i.e., software code portions, which, when executed on at least one processor, cause the at least one processor to carry out the actions described herein, as performed by the first network node 611. The computer program product may be stored on a computer-readable storage medium. The computer-readable storage medium, having stored thereon the computer program, may comprise instructions which, when executed on at least one processor, cause the at least one processor to carry out the actions described herein, as performed by the first network node 611. In some embodiments, the computer-readable storage medium may be a non-transitory computer-readable storage medium, such as a CD ROM disc, or a memory stick. In other embodiments, the computer program product may be stored on a carrier containing the computer program of the previous claim, wherein the carrier is one of an electronic signal, optical signal, radio signal, or the computer-readable storage medium, as described above.

The first network node 611 may further comprise a memory 1005 comprising one or more memory units. The memory 1005 may be arranged to be used to store obtained information, such as the information received by the processor 1004, store data configurations, schedulings, and applications etc. to perform the methods herein when being executed in the first network node 611. Memory 1005 may be in communication with the processor 1004. Any of the other information processed by the processor 1004 may also be stored in the memory 1005.

In some embodiments, information e.g., from the second network node 612, may be received through a receiving port 1006. The receiving port 1006 may be in communication with the processor 1004. The receiving port 1006 may also be configured to receive other information.

The processor 1004 may be further configured to send messages, e.g., to the second network node 612, through a sending port 1007, which may be in communication with the processor 1004, and the memory 1005.

Those skilled in the art will also appreciate that the any module within the first network node 611, e.g., the determining module 1001, the initiating module 1002, and the sending module 1003 described above, may refer to a combination of analog and digital circuits, and/or one or more processors configured with software and/or firmware, e.g. stored in the memory, that when executed by the one or more processors such as the processor 1004, perform actions as described above, in relation to FIGS. 7-9c. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention.

The invention claimed is:

1. A method performed by a first network node, the method comprising:
   determining a first amount of resources associated with a usage of a first Multi Path Transmission Control Protocol (MPTCP) connection between the first network node and a second network node;
   determining whether the determined first amount of resources meets a first criterion;
   in response to determining that the determined first amount of resources meets the first criterion, initiating a second MPTCP connection between the first network node and the second network node in addition to the first MPTCP connection;
   after initiating the second MPTCP connection, using both the first and second MPTCP connection to transmit data to or receive data from the second network node;
   while using both the first and second MPTCP connection to transmit data to or receive data from the second network node, determining a second amount of resources associated with a usage of the first MPTCP connection between the first network node and the second network node;
   determining whether the determined second amount of resources meets a second criterion; and
   in response to determining that the determined second amount of resources meets the second criterion, terminating the second MPTCP connection.

2. The method of claim 1, wherein the method further comprises:
   determining that a second internet protocol address is to be generated to initiate the second MPTCP connection, wherein the first MPTCP connection is associated with a first internet protocol address.

3. The method of claim 1, further comprising:
   initiating a Packet Data Protocol, PDP, context activation to the second network node when the first network node determines that a second internet protocol address is to be generated to initiate the second MPTCP connection.

4. The method of claim 1, wherein the first criterion is a threshold, and wherein the determining whether the second MPTCP connection is to be initiated, based on whether the determined amount of resources meets the first criterion further comprises determining whether the determined amount of resources exceeds the threshold,
wherein the determining of whether the second MPTCP connection is to be initiated comprises determining that the second MPTCP connection is to be initiated when the determined amount of resources exceeds the threshold.

5. The method of claim 1, wherein the second network node is a Multi Path Transmission Control Protocol Proxy and the first network node is a Customer Premises Equipment.

6. The method of claim 1, further comprising:
after determining that the second MPTCP connection is to be initiated, sending a message to the second network node, the message comprising an instruction to initiate the second MPTCP connection.

7. The method of claim 1, wherein
the first MPTCP connection is in accordance with a first communication technology,
the second MPTCP connection is in accordance with a second communication technology, and
the second communication technology is a mobile technology.

8. The method of claim 1, wherein the first network node is a Multi Path Transmission Control Protocol Proxy and the second network node is a Customer Premises Equipment.

9. The method of claim 7, wherein the first communication technology is a fixed technology.

10. The method of claim 1, wherein
the first network node has a buffer storing data to be transmitted over the first MPTCP connection,
determining the first amount of resources associated with the usage of the first MPTCP connection comprises obtaining a buffer fill value indicating the amount of data in the buffer, and
determining whether the determined first amount of resources meets the first criterion comprises comparing the buffer fill value to a threshold.

11. A non-transitory computer-readable storage medium, having stored thereon a computer program, comprising instructions which, when executed on at least one processor, cause the at least one processor to carry out the method of claim 1.

12. A first network node, the first network node being configured to:
determine a first amount of resources associated with a usage of a first Multi Path Transmission Control Protocol (MPTCP) connection between the first network node and a second network node;
determine whether the determined first amount of resources meets a first criterion;
in response to determining that the determined first amount of resources meets the first criterion, initiate a second MPTCP connection between the first network node and the second network node in addition to the first MPTCP connection;
after initiating the second MPTCP connection, use both the first and second MPTCP connection to transmit data to or receive data from the second network node;
while using both the first and second MPTCP connection to transmit data to or receive data from the second network node, determine a second amount of resources associated with a usage of the first MPTCP connection between the first network node and the second network node;
determine whether the determined second amount of resources meets a second criterion; and
in response to determining that the determined second amount of resources meets the second criterion, terminate the second MPTCP connection.

13. The first network node of claim 12, wherein the first network node is further configured to:
determine that a second internet protocol address is to be generated to initiate the second MPTCP connection, wherein the first MPTCP connection is associated with a first internet protocol address.

14. The first network node of claim 12, being further configured to:
initiate a Packet Data Protocol, PDP, context activation to the second network node when the first network node determines that a second internet protocol address is to be generated to initiate the second MPTCP connection.

15. The first network node of claim 12, wherein the first criterion is a threshold, and wherein to determine whether the second MPTCP connection is to be initiated, based on whether the determined amount of resources meets the first criterion comprises to determine whether the determined amount of resources exceeds the threshold,
wherein to determine whether the second MPTCP connection is to be initiated comprises to determine that the second MPTCP connection is to be initiated when the determined amount of resources exceeds the threshold.

16. The first network node of claim 12, wherein the second network node is a Multi Path Transmission Control Protocol Proxy and the first network node is a Customer Premises Equipment.

17. The first network node of claim 12, being further to:
send a message to the second network node, the message comprising an instruction to initiate the second MPTCP connection, after a determination that the second MPTCP connection is to be initiated based on the determined amount of resources meeting the first criterion.

18. The first network node of claim 12, wherein the first network node is a Multi Path Transmission Control Protocol Proxy and the second network node is a Customer Premises Equipment.

19. The first network node of claim 12, wherein
the first MPTCP connection is in accordance with a first communication technology,
the second MPTCP connection is in accordance with a second communication technology, and
the first communication technology is a fixed technology.

20. The first network node of claim 19, wherein the second communication technology is a mobile technology.

* * * * *